(12) United States Patent
Matsugatani et al.

(10) Patent No.: US 11,515,759 B2
(45) Date of Patent: Nov. 29, 2022

(54) BRUSH DEVICE, MOTOR, AND METHOD FOR MANUFACTURING BRUSH DEVICE

(71) Applicant: DENSO CORPORATION, Kariya (JP)

(72) Inventors: Kazuhi Matsugatani, Kariya (JP); Kenta Goto, Kariya (JP)

(73) Assignee: DENSO CORPORATION, Kariya (JP)

( * ) Notice: Subject to any disclaimer, the term of this patent is extended or adjusted under 35 U.S.C. 154(b) by 169 days.

(21) Appl. No.: 16/957,548

(22) PCT Filed: Jan. 25, 2019

(86) PCT No.: PCT/JP2019/002580
§ 371 (c)(1),
(2) Date: Jun. 24, 2020

(87) PCT Pub. No.: WO2019/151161
PCT Pub. Date: Aug. 8, 2019

(65) Prior Publication Data
US 2021/0067008 A1    Mar. 4, 2021

(30) Foreign Application Priority Data

Feb. 2, 2018  (JP) .............................. JP2018-017450
Feb. 2, 2018  (JP) .............................. JP2018-017451

(51) Int. Cl.
*H02K 11/026*  (2016.01)
*H02K 5/14*    (2006.01)
(Continued)

(52) U.S. Cl.
CPC ........... *H02K 11/026* (2013.01); *H02K 5/148* (2013.01); *H02K 15/14* (2013.01); *H02K 13/00* (2013.01)

(58) Field of Classification Search
CPC ...... H02K 11/026; H02K 11/06; H02K 5/148; H02K 15/14; H02K 13/00; H02K 13/105
(Continued)

(56) References Cited

U.S. PATENT DOCUMENTS 4,844,621 A * 7/1989 Umemura .............. F02M 37/08
                                              415/55.5
5,221,130 A * 6/1993 Satoh ................... H02K 11/026
                                              310/239
(Continued)

FOREIGN PATENT DOCUMENTS

JP    H04-124858 U    11/1992
JP    2000-060076 A    2/2000
(Continued)

OTHER PUBLICATIONS

English machine translation, Kito JP 2009268207 (Year: 2009).*
May 7, 2019 Search Report issued in International Patent Application No. PCT/JP2019/002580.

*Primary Examiner* — Burton S Mullins
(74) *Attorney, Agent, or Firm* — Oliff PLC

(57) ABSTRACT

A brush device includes a holder, a brush, a choke coil, and a terminal member. The holder includes a base extending in a direction orthogonal to an axial direction of an armature. The choke coil includes a core and a winding. The core extends in the axial direction of the armature and includes a first end surface in a longitudinal direction faced toward the base of the holder and a second end surface in the longitudinal direction located at a side opposite to the first end surface. The terminal member is coupled to the holder and connected to the winding. The terminal member includes a contact portion that is in contact with the second end surface of the core.

4 Claims, 6 Drawing Sheets

(51) Int. Cl.
*H02K 13/00* (2006.01)
*H02K 15/14* (2006.01)

(58) Field of Classification Search
USPC .......................................................... 310/83
See application file for complete search history.

(56) References Cited

U.S. PATENT DOCUMENTS 6,104,110 A    8/2000   Uchida et al.
9,583,995 B2 *   2/2017   Yamaguchi .......... H02K 13/006

FOREIGN PATENT DOCUMENTS

| | | | |
|---|---|---|---|
| JP | 2005-124288 A | 5/2005 | |
| JP | 2009-268207 A | 11/2009 | |
| JP | 2009268207 * | 11/2009 | ............... H02K 5/22 |
| JP | 2012-147569 A | 8/2012 | |
| JP | 2017-169351 A | 9/2017 | |
| WO | 2016/013178 A1 | 1/2016 | |

* cited by examiner

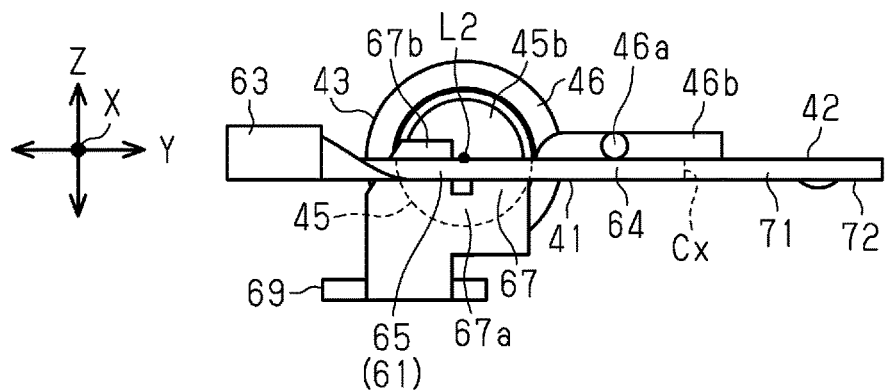
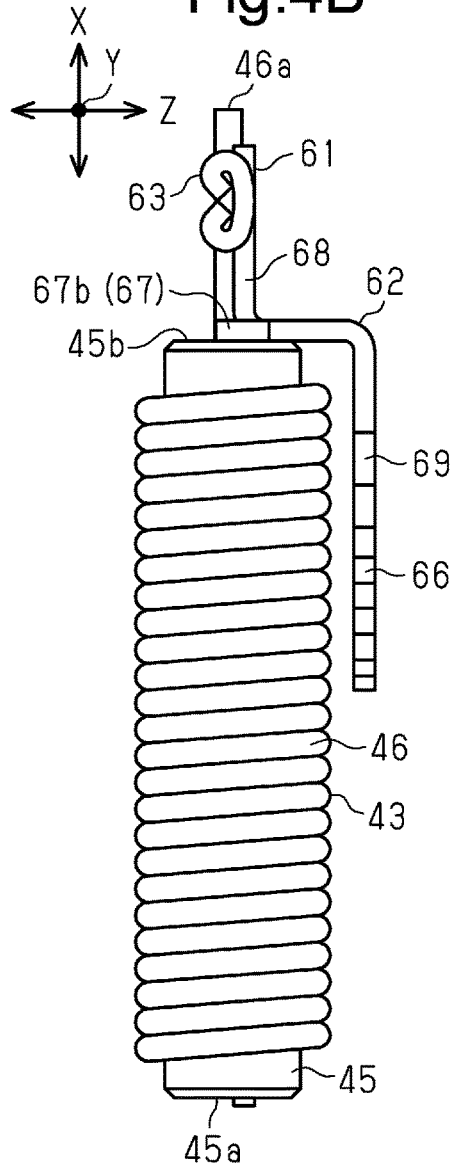
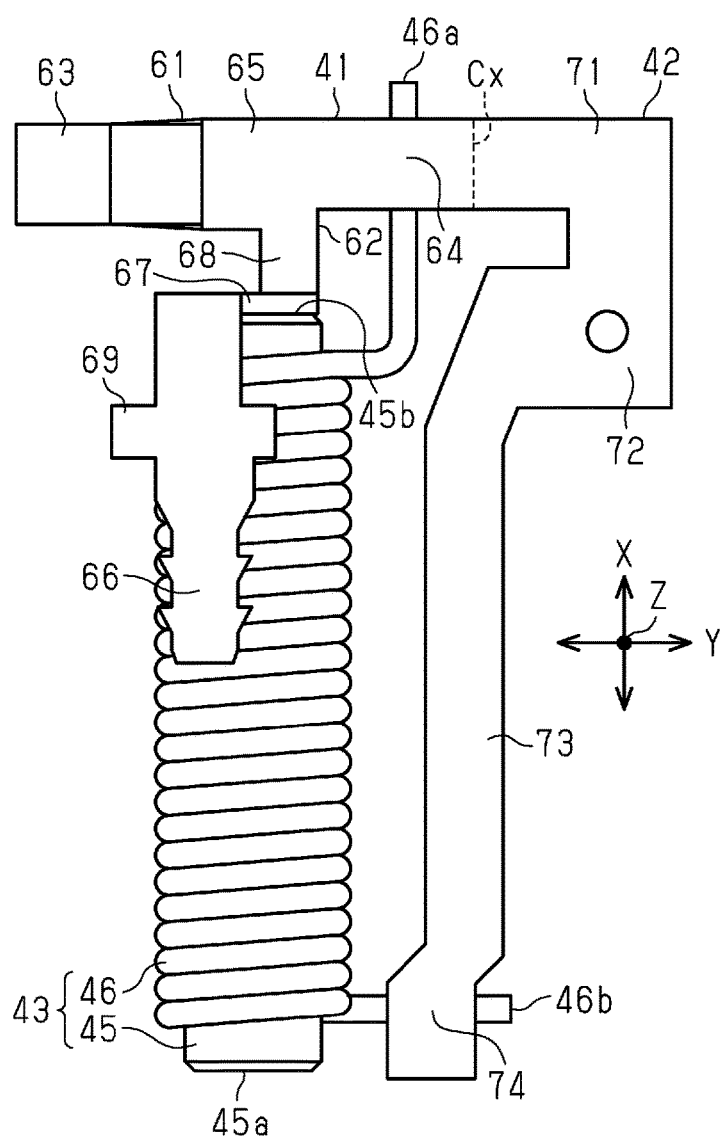

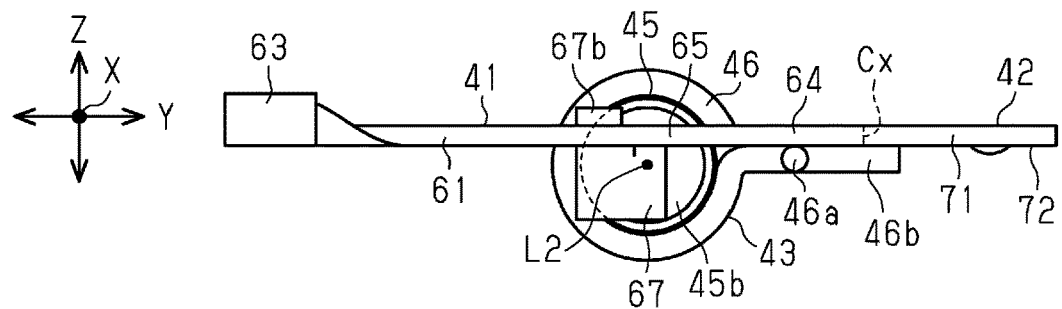
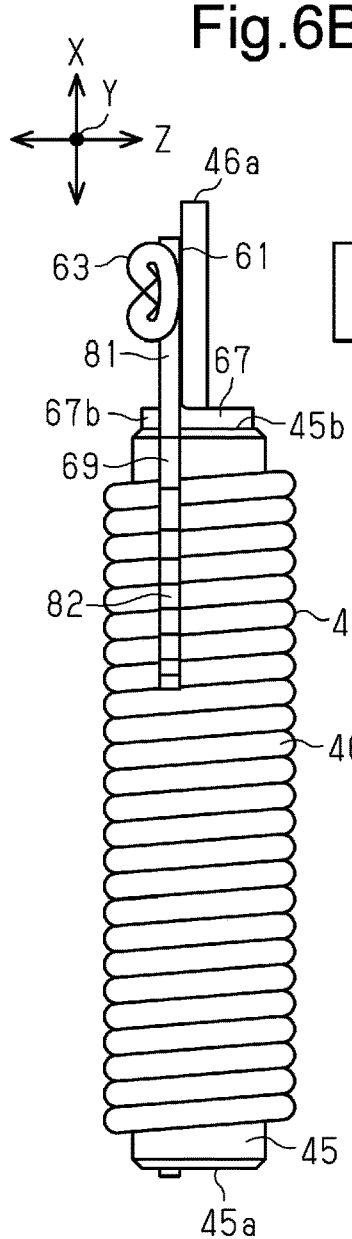
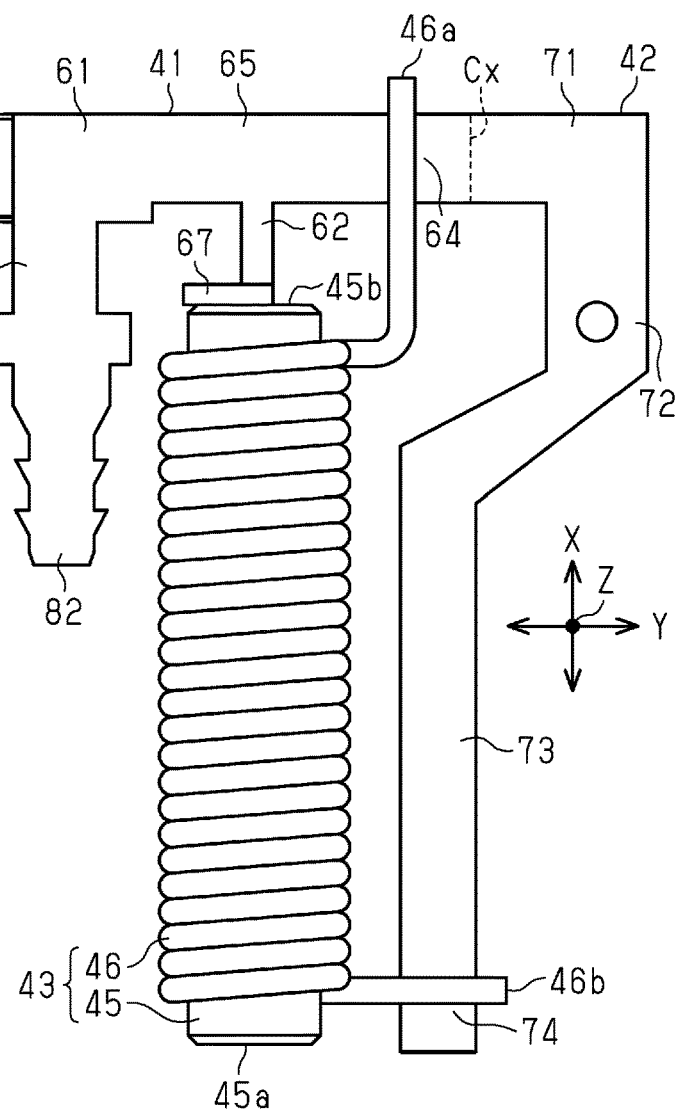

BRUSH DEVICE, MOTOR, AND METHOD FOR MANUFACTURING BRUSH DEVICE

CROSS-REFERENCE TO RELATED APPLICATION

This application is based on Japanese Patent Application No. 2018-017450 filed on Feb. 2, 2018 and Japanese Application No. 2018-017451 filed on the same date, and the contents thereof are incorporated herein by reference.

TECHNICAL FIELD

The present disclosure relates to a brush device, a motor, and a method for manufacturing a brush device.

BACKGROUND ART

Patent Document 1 describes an example of a conventional brush device that includes a holder (brush holder) to which a brush is coupled. The holder includes a choke coil serving as a noise reduction element which is electrically connected to the brush by a terminal member (power feed terminal). The choke coil is formed by a winding wound around an outer circumference of a core. The core is coupled to the holder so that the longitudinal direction of the core coincides with an axial direction of a motor (armature).

Further, the brush device disclosed in Patent Document 1 includes a connector to which an external connector is connected. A power feed circuit from the connector to the brush includes the choke coil. The choke coil includes a first terminal wire extending from one axial end of the choke coil. The first terminal wire is connected by a first terminal member to a terminal embedded in the holder (first embedded terminal 44 in Patent Document 1). Also, the choke coil includes a second terminal wire extending from the other axial end of the choke coil and connected to a thermistor by a second terminal member.

PRIOR ART DOCUMENT

Patent Document

Patent Document 1: Japanese Laid-Open Patent Publication No. 2017-169351

SUMMARY OF THE INVENTION

In the brush device, force such as vibration applied to the terminal member may act on a connecting portion of the terminal member and the choke coil (winding) and break the connecting portion.

A first objective of the present disclosure is to provide a brush device, a motor, and a method for manufacturing a brush device that relieves stress from a connecting portion of a terminal member and a choke coil.

In the brush device of Patent Document 1, the terminal (first embedded terminal 44), which is a part of the power feed circuit that is connected to the first terminal wire of the choke coil, and the second terminal member, which is a part in the power feed circuit connected to the second terminal wire of the choke coil, are located adjacent to each other so that the plate planes of the terminal and the second terminal member are faced toward each other. The part in the power feed circuit that is connected to the first terminal wire of the choke coil refers to a portion that extends from the first terminal wire to the brush. The part in the power feed circuit that is connected to the second terminal wire of the choke coil refers to a portion that extends from the second terminal wire to the connector (power feed side). Thus, parasitic capacitance may be generated between the terminal and the second terminal member. As a result, noise generated by the brush may bypass the choke coil and flow between the terminal and the second terminal member to the connector (power feed side). In particular, circuit components of the power feed circuit are inevitably concentrated in a compact motor. Thus, the noise-bypassing problem described above becomes more noticeable.

A second objective of the present disclosure is to provide a brush device and a motor that does not allow noise to bypass the choke coil and flow through the part connected to the first terminal wire of the choke coil and the part connected to the second terminal wire of the choke coil.

A brush device in accordance with a first aspect of the present disclosure includes a holder, a brush, a choke coil, and a terminal member. The holder includes a base extending in a direction orthogonal to an axial direction of an armature. The brush is coupled to the holder and configured to feed power to a commutator of the armature. The choke coil includes a core, which is arranged on the holder, and a winding, which is wound around an outer circumference of the core and electrically connected to the brush. The core extends in the axial direction of the armature and includes a first end surface in a longitudinal direction faced toward the base of the holder and a second end surface in the longitudinal direction located at a side opposite to the first end surface. The terminal member is coupled to the holder and connected to the winding. The terminal member includes a contact portion that is in contact with the second end surface of the core.

With the above configuration, the contact portion of the terminal member is in contact with the end surface of the core of the choke coil. This releases force such as vibration, which is applied to the terminal member, from the contact portion toward the choke coil. Thus, stress is relieved from the connecting portion of the winding of the choke coil and the terminal member. As a result, a breakage or the like is limited in the connecting portion of the winding of the choke coil and the terminal member. Further, an assembly including the choke coil and the terminal member can be coupled to the holder from the first end surface of the core in its axial direction after the winding of the choke coil and the terminal member are connected to each other. In this case, a reaction force from the holder toward the choke coil during the assembly is received by the contact portion of the terminal member that is in contact with the second end surface of the core. This reduces situations in which the reaction force acts on the connecting portion of the winding of the choke coil and the terminal member and causes a breakage or the like in the connecting portion.

A brush device in accordance with a second aspect of the present disclosure includes a brush, a holder, and a power feed circuit. The brush is in slidable contact with a commutator of an armature. The holder includes a holder main body, which holds the brush, and a connecter, to which an external connector is connected. The power feed circuit extends from the connector to the brush. The power feed circuit includes a choke coil, a first terminal member, a second terminal member, a first circuit component, and a second circuit component. The choke coil is arranged on the holder main body parallel to an axial direction of the armature. The first terminal member is connected to a first terminal wire extending from one axial end of the choke coil. The second terminal member is connected to a second terminal wire extending from another axial end of the choke coil. The first circuit component is connected to a first connecting portion of the first terminal member. The second circuit component is connected to a second connecting portion of the second terminal member. As viewed in an axial direction of the choke coil, the first connecting portion and the second connecting portion are located at opposite sides of the choke coil.

With the above configuration, in the power feed circuit extending from the connector to the brush, a part that is connected to the first terminal wire of the choke coil (portion from first terminal wire to brush) is spaced apart from a part that is connected to the second terminal wire of the choke coil in the power feed circuit (portion from second terminal wire to connector in power feed circuit). This limits parasitic capacitance generated between the two parts in the circuit. Therefore, the flow of bypassing noise in the two parts is limited. This reduces noise that flows, for example, from the brush to the connector.

The present disclosure in accordance with a third aspect provides a method for manufacturing a brush device. The brush device includes a holder, a brush, a choke coil, and a terminal member. The holder includes a base extending in a direction orthogonal to an axial direction of an armature. The brush is coupled to the holder and configured to feed power to a commutator of the armature. The choke coil includes a core, which is arranged on the holder, and a winding, which is wound around an outer circumference of the core and electrically connected to the brush. The core extends in the axial direction of the armature and includes a first end surface in a longitudinal direction faced toward the base of the holder and a second end surface located at a side opposite to the first end surface. The terminal member is coupled to the holder and connected to the winding. The method for manufacturing the brush device includes connecting the winding of the choke coil to the terminal member. Subsequent to the connecting, an assembly including the choke coil and the terminal member is coupled to the holder from the first end surface of the core in its axial direction. In the coupling, the contact portion of the terminal member is brought into contact with the second end surface of the core.

With the above configuration, a reaction force from the holder acting on the choke coil in the coupling process is received by the contact portion of the terminal member, which is in contact with the second end surface of the core. This relieves stress from the connecting portion of the winding of the choke coil and the terminal member. As a result, breakage or the like is limited in the connecting portion of the winding of the choke coil and the terminal member.

BRIEF DESCRIPTION OF THE DRAWINGS

The invention, together with objects and advantages thereof, may best be understood by reference to the following description of the presently preferred embodiment together with the accompanying drawings in which:

FIGS. 4A and 4B are diagrams of a first terminal member, a second terminal member, and a choke coil of the embodiment, in which FIG. 4A is a side view as viewed in a Z-axis direction, FIG. 4B is a front view as viewed in a Y-axis direction, and FIG. 4C is a plan view as viewed in an X-axis direction;

FIGS. 6A to 6C are diagrams of a first terminal member, a second terminal member, and a choke coil of a modified example, in which FIG. 6A is a side view as viewed in the Z-axis direction, FIG. 6B is a front view as viewed in the Y-axis direction, and FIG. 6C is a plan view as viewed in the X-axis direction.

MODE FOR CARRYING OUT THE INVENTION

Figure 1:
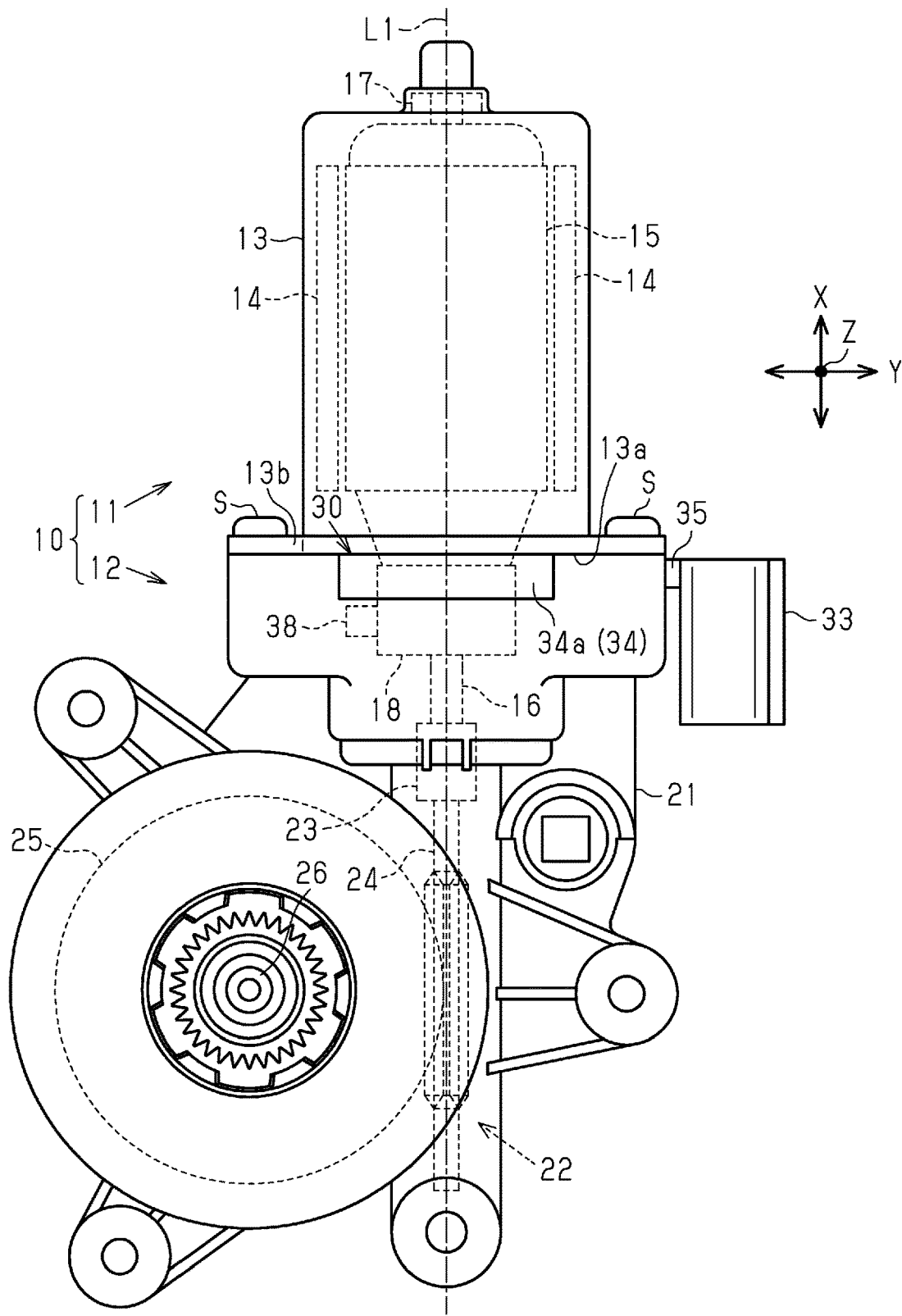
FIG. 1 is a side view of a motor in accordance with one embodiment.

One embodiment of a brush device, a motor, and a method for manufacturing a brush device will now be described with reference to the drawings. The drawings may not be to scale, and the relative size, proportions, and depiction of elements in the drawings may be exaggerated or simplified for clarity, illustration, and convenience. In the description hereafter, unless particularly mentioned otherwise, "axial direction", "radial direction", and "circumferential direction" respectively refer to an axial direction of a rotation axis L1, a radial direction, and a circumferential direction of a motor (armature).

A motor 10 of the present embodiment in FIG. 1 is a brushed motor. The motor 10 is used as, for example, a drive source for an electric seat device of a vehicle. The motor 10 includes a motor main body 11 and a reduction gear 12. The motor main body 11 generates rotational force. The reduction gear 12 reduces the speed of the rotation output from the motor main body 11 to output high torque. The drawings show X-, Y-, and Z-axes, in which the X-axis indicates an axial direction of the motor 10, the Y-axis indicates a widthwise direction of the motor 10 that is orthogonal to the X-axis, and the Z-axis indicates a thickness-wise direction of the motor 10 that is orthogonal to an XY-plane.

The motor main body 11 includes a yoke housing 13 that is cylindrical and has a closed bottom. The yoke housing 13 includes an open portion 13a open toward the reduction gear 12 in the X-axis direction. The yoke housing 13 includes a flange 13b extended radially outward from the open portion 13a. The yoke housing 13 has an inner circumferential surface on which field magnets 14 are fixed. An armature 15 is rotatably arranged at an inner circumference side of the field magnets 14.

The armature 15 includes a rotation shaft 16 at its axial center. The rotation shaft 16 includes a basal end (upper end in FIG. 1) that is rotatably supported by a bearing 17, which is coupled to a central portion in the bottom of the yoke housing 13. Further, the armature 15 includes a commutator 18 configured so that brushes 38 of a brush device 30 slide in contact with the commutator 18. The brushes 38, which will be described later, is coupled to the open portion 13a of the yoke housing 13.

The reduction gear 12 includes a gear housing 21 and a reduction gear mechanism 22 accommodated in the gear housing 21. The gear housing 21 is fastened to the flange 13b of the yoke housing 13 by screws S. The reduction gear mechanism 22 includes a worm shaft 24 and a worm wheel 25. The worm shaft 24 is connected by a linking member 23 to a distal end of the rotation shaft 16, which is extended from the motor main body 11. The worm wheel 25 is meshed with the worm shaft 24. An output unit 26 is arranged in a central portion of the worm wheel 25. The rotation output from the rotation shaft 16 is decelerated by the worm shaft 24 and the worm wheel 25 and output from the output unit 26.

Figure 2:
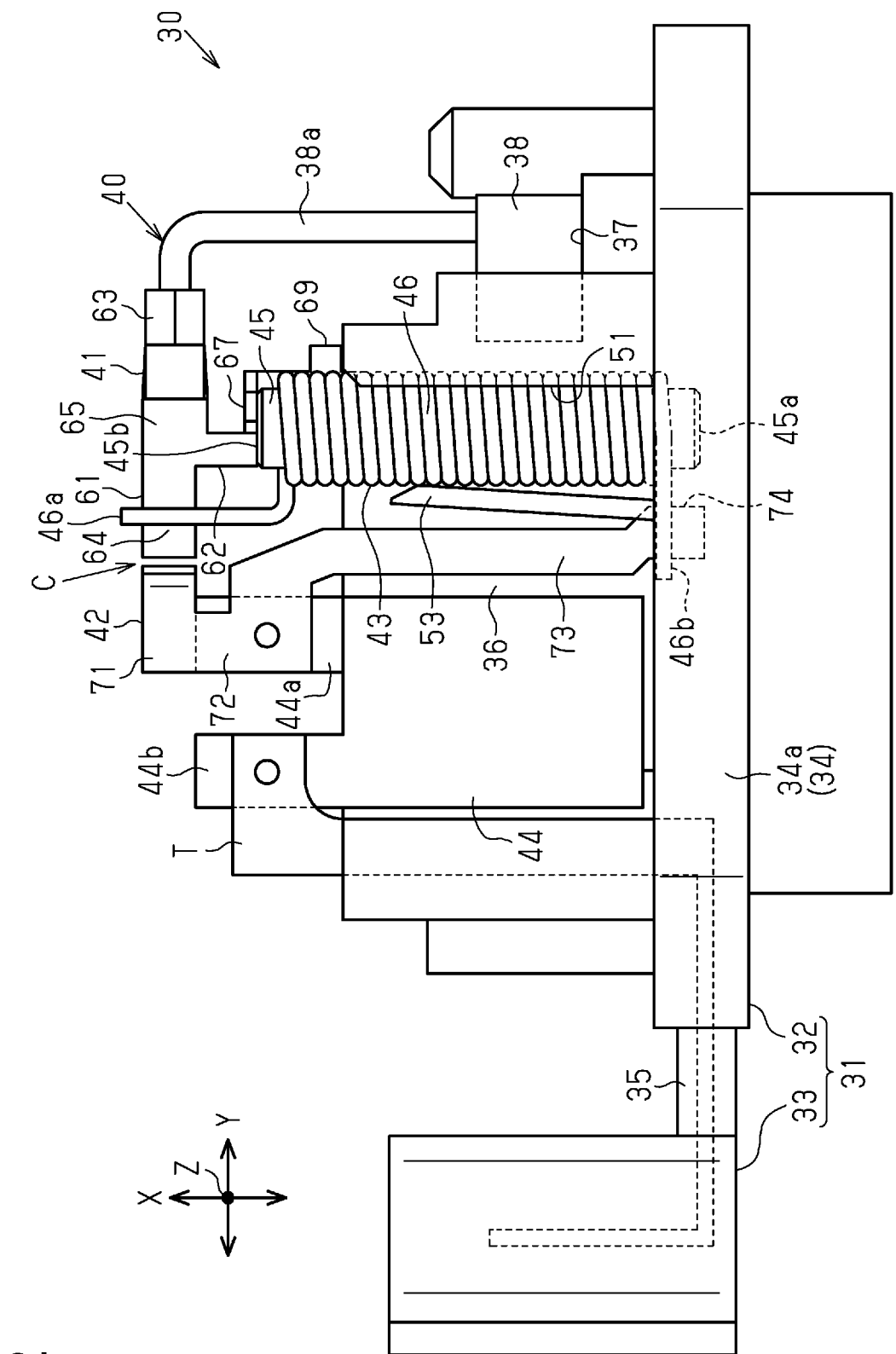
FIG. 2 is a side view of a brush device in accordance with the embodiment.
Figure 3:
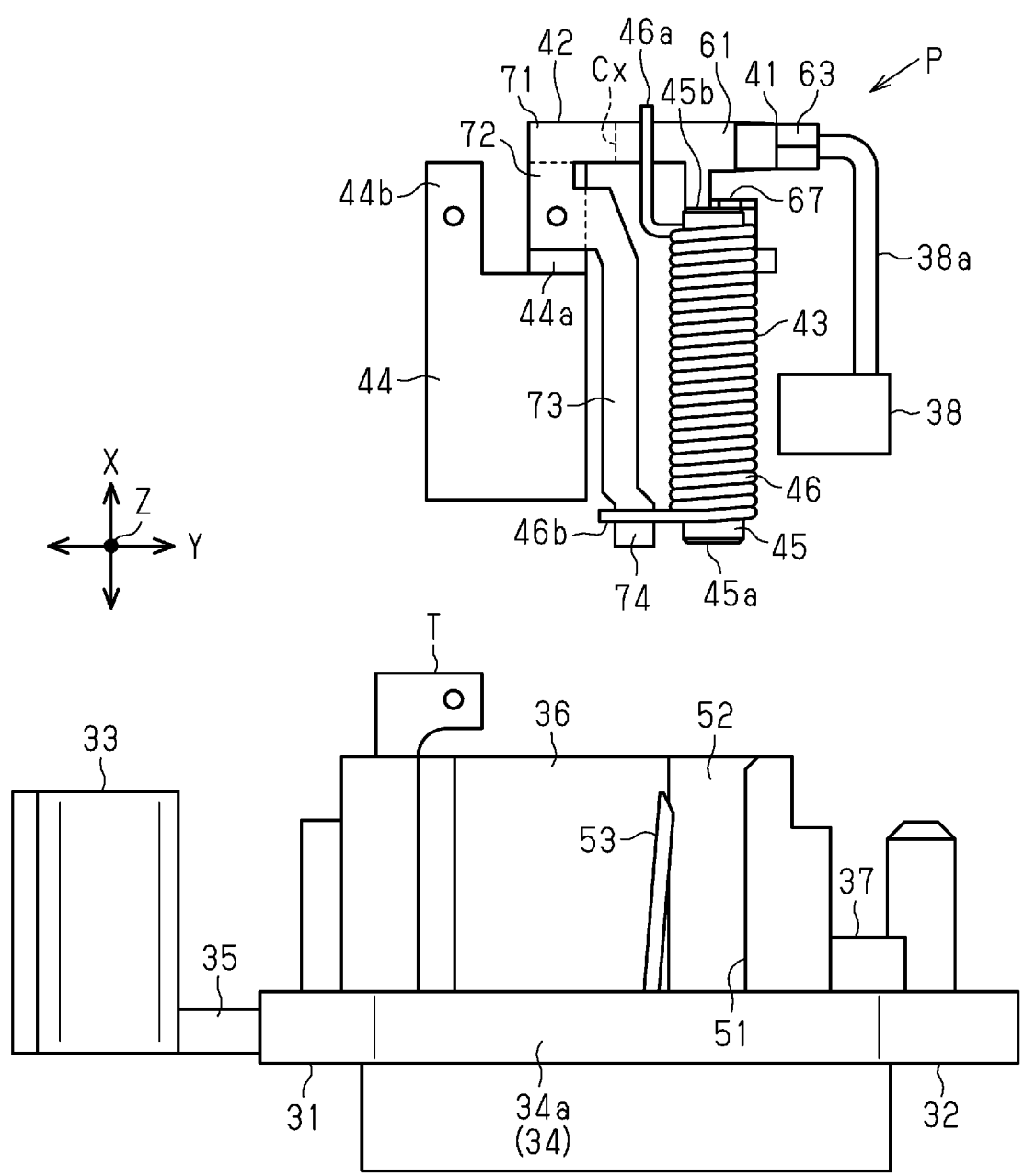
FIG. 3 is a side view illustrating a coupling mode of the brush device in accordance with the embodiment.

As shown in FIGS. 2 and 3, the brush device 30 includes a holder 31 mounted on the open portion 13a of the yoke housing 13. The holder 31 is formed from an insulative resin material. The holder 31 includes a holder main body 32 and a connector 33. The holder main body 32 closes the open portion 13a of the yoke housing 13. The connector 33 is integrally formed with the holder main body 32.

The holder main body 32 includes a base 34 and a seal 34a, which is formed from an elastomer and arranged on a periphery of the base 34. The base 34 extends in a direction orthogonal to the axis of the motor 10 (armature 15) (along the YZ-plane). The seal 34a arranged on the periphery of the base 34 is sandwiched by the flange 13b of the yoke housing 13 and the gear housing 21 in the axial direction (X-axis direction) and seals a gap between the flange 13b and the gear housing 21 (refer to FIG. 1). An extension portion 35 extends from the holder main body 32 of the base 34 in the Y-axis direction and includes a distal end at which the connector 33 is formed.

The holder main body 32 includes a commutator accommodation portion 36 projecting from the base 34 in the axial direction (X-axis direction). The commutator accommodation portion 36 is located inside the gear housing 21 to accommodate the commutator 18. The commutator accommodation portion 36 includes a bearing (not shown) that supports the rotation shaft 16, and the distal end of the rotation shaft 16 is projected axially outward from the commutator accommodation portion 36.

The holder main body 32 includes two brush accommodation portions 37 in a peripheral part of the commutator accommodation portion 36 (only one is shown in FIGS. 2 and 3). The brush accommodation portions 37 are both arranged at one side of the commutator accommodation portion 36 in the Y-axis direction Y (side opposite to extension portion 35). Each brush accommodation portion 37 accommodates the brush 38 of which the distal end is in slidable contact with an outer surface of the commutator 18. An interval (angle) between the brushes 38 in the circumferential direction is set to 90°.

In the holder main body 32, an electric component is coupled to the corresponding brush 38 at two ends of the commutator accommodation portion 36 in the Z-axis direction. The electric components at the two sides of the commutator accommodation portion 36 have substantially the same basic configuration. Thus, FIGS. 2 and 3 only show an electric component 40 at one side in the Z-axis direction, and the electric component at the other side is not shown in the drawings and will not be described in detail.

As shown in FIG. 2, the electric component 40 includes a first terminal member 41 (first power feed terminal), a second terminal member 42 (second power feed terminal), a choke coil 43, and a thermistor 44 (electronic component, second circuit component).

The choke coil 43 is formed by a winding 46 wound around an outer circumference of a cylindrical core 45. The choke coil 43 is arranged on the holder 31 so that a coil axial direction (longitudinal direction of core 45) is parallel to the axial direction of the motor 10 (X-axis direction). In the description hereafter, among the two end surfaces of the core 45 in the longitudinal direction (X-axis direction), the end surface directed toward the base 34 of the holder 31 will be referred to as a first end surface 45a, and the end surface at the opposite side will be referred to as a second end surface 45b. Also, in the description of the choke coil 43 and its related parts, to facilitate understanding, the portion closer to the first end surface 45a in the X-axis direction will be referred to as a lower side, and the portion closer to the second end surface 45b will be referred to as an upper side.

As shown in FIGS. 2 and 3, the holder 31 includes a choke coil holding portion 51 extending from the base 34 in the axial direction (X-axis direction). The choke coil holding portion 51, which is arcuate and in conformance with the outer circumferential surface of the choke coil 43, includes a guide surface 52 and a holding piece 53. The guide surface 52 guides the choke coil 43 when coupled. The holding piece 53 opposes the guide surface 52 with the choke coil 43 located in between. The holding piece 53 is a flexible member extended from the base 34 and is configured to elastically press the choke coil 43 against the guide surface 52. Thus, the choke coil holding portion 51 sandwiches and holds the choke coil 43 with the guide surface 52 and the holding piece 53.

As shown in FIG. 2, two ends of the core 45 in the X-axis direction project from two ends of the winding 46. A first terminal wire 46a extends from an upper end of the winding 46 of the choke coil 43 and connects to the first terminal member 41. Further, a second terminal wire 46b extends from a lower end of the winding 46 and connects to the second terminal member 42. That is, the first terminal member 41 and the second terminal member 42 are electrically connected to each other via the winding 46 of the choke coil 43. The first terminal member 41 and the second terminal member 42 are formed by stamping a metal sheet. Further, the first terminal member 41 and the second terminal member 42 are connected to each other before being coupling to the holder 31 (holder main body 32). After being coupled to the holder 31, the first terminal member 41 and the second terminal member 42 are cut and separated at a predetermined location (cut portion C) (refer to FIG. 3 etc.).

The configuration, such as the shape of the first terminal member 41 and the second terminal member 42 will now be described with reference to FIGS. 2, 4A, 4B, and 4C. FIGS. 4A, 4B, and 4C show a state before the cut portion C is cut (before being coupled to holder 31), that is a state in which the first and second terminal members 41 and 42 are connected to each other. Also, FIG. 4A is a diagram showing a rear side of the first and second terminal members 41 and 42 and the choke coil 43 of FIG. 3.

The first terminal member 41 includes a first section 61 and a second section 62. The first section 61 is located at an upper part of the core 45 (side opposite to base 34 in the axial direction). The second section 62 extends downward from the first section 61 (extends toward base 34 in the axial direction). The first section 61 is mainly plate-like and disposed parallel to the XY-plane. Further, the first section 61 extends in a direction orthogonal to the longitudinal direction of the core 45 (Y-axis direction).

As shown in FIGS. 2, 4A, and 4C, the first section 61 includes a first connecting portion 63 (brush-side connecting portion) and a coil-side connecting portion 64. The first connecting portion 63 is connected to a pigtail 38a (first circuit component). The coil-side connecting portion 64 is connected to the first terminal wire 46a of the winding 46 (choke coil 43). The first connecting portion 63 and the coil-side connecting portion 64 may employ a connection method such as welding, heat staking, or soldering. Further, the first section 61 includes an opposing portion 65 between the first connecting portion 63 and the coil-side connecting portion 64, and the opposing portion 65 opposes the second end surface 45b of the core 45 in the axial direction (X-axis direction).

As shown in FIGS. 4A, 4B, and 4C, the second section 62 extends from the opposing portion 65 of the first section 61 toward the core 45 in the X-axis direction and is bent in a crank-shaped manner in the Z-axis direction. The second section 62 includes a fastening portion 66 at a distal end, which opposes the holder 31, and a contact portion 67 at an intermediate part.

More specifically, the second section 62 includes an extension portion 68 extending from the opposing portion 65 of the first section 61 toward the core 45 in the X-axis direction. Further, a lower end of the extension portion 68 is bent in the Z-axis direction to form the contact portion 67. The contact portion 67 is in contact with the second end surface 45b of the core 45 in the longitudinal direction of the core 45 (X-axis direction).

As shown in FIG. 4C, the contact portion 67 includes a first extension 67a and a second extension 67b. The first extension 67a extends in the Y-axis direction from the lower end of the extension portion 68, which is bent in the Z-axis direction. The second extension 67b extends from the first extension 67a in the Z-axis direction. An area of contact between the contact portion 67 including the first and second extensions 67a and 67b and the second end surface 45b of the core 45 is set to be greater than or equal to one-half of an entire area of the second end surface 45b of the core 45. Also, when the second end surface 45b of the core 45 is divided into two equivalent regions with respect to center axis L2 of the core 45 in the Z-axis direction, the second extension 67b of the contact portion 67 is in contact with both regions.

As shown in FIGS. 4A and 4B, the distal end (lower end) of the second section 62 includes the fastening portion 66 extending downward in the X-axis direction from a portion extending from the contact portion 67 (first extension 67a) in the Z-axis direction (opposite to second extension 67b). The fastening portion 66 is press-fitted and fixed in the X-axis direction to a fitting portion (not shown) arranged in the holder 31 (holder main body 32). Also, a positioning portion 69 is arranged on the upper part of the fastening portion 66 and projected from the second section 62 toward opposite sides in the Y-axis direction. The positioning portion 69 comes into contact with the holder 31 to determine a press-fit length of the fastening portion 66. Accordingly, the second section 62 includes the extension portion 68, the contact portion 67, the fastening portion 66, and the positioning portion 69, which are integrated with each other.

As described above, the second terminal member 42 is parallel to the XY-plane and formed from a metal sheet, which is separated from the first terminal member 41.

As shown in FIGS. 2 and 4A, the second terminal member 42 includes a first section 71 arranged next to the first section 61 of the first terminal member 41 in the Y-axis direction. The first section 71 is continuous with the first section 61 of the first terminal member 41 before being coupled to the holder 31. After being coupled to the holder 31, the first sections 61 and 71 are cut and separated at the cut portion C. In FIG. 4, a planned cutting portion Cx is indicated by the broken line.

As shown in FIG. 2, the second terminal member 42 includes a second connecting portion 72 (thermistor-side connecting portion) that extends downward from the first section 71 in the X-axis direction (toward base 34). As viewed in the axial direction, the second connecting portion 72 and the first connecting portion 63 are located at opposite sides of the choke coil 43. More specifically, in the Y-axis direction, the first connecting portion 63, the choke coil 43, and the second connecting portion 72 are arranged in this order. Further, the second connecting portion 72 and the first connecting portion 63 are located on the same plane (XY-plane), which is parallel to the axial direction.

The second connecting portion 72 is connected to a first terminal 44a of the thermistor 44. A second terminal 44b of the thermistor 44 is connected to terminal T that is arranged on the holder 31. The first and second terminals 44a and 44b may employ a connection method such as welding, staking, or soldering.

The terminal T is insert molded integrally with the holder 31 and partially embedded in the holder 31. The terminal T includes one end that is projected from the holder main body 32 in the axial direction and connected to the thermistor 44 and another end that extends through the extension portion 35 to the connector 33. The other end of the terminal T (closer to connector 33) is configured to be electrically connected to an external connector (not shown), which is connected to the connector 33.

The second terminal member 42 includes an extension 73 that extends downward in the X-axis direction from the second connecting portion 72. A coil-side connecting portion 74 at a lower end of the extension 73 (closer to base 34 in X-axis direction) is connected to the second terminal wire 46b of the choke coil 43 (winding 46) by welding, staking, soldiering, or the like.

Figure 5:
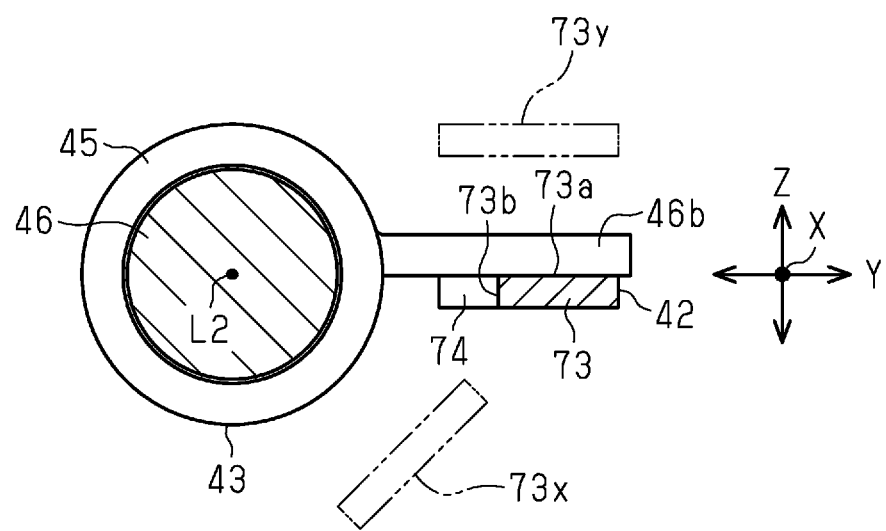
FIG. 5 is a schematic cross-sectional view illustrating a positional relationship of the choke coil and an extension of the second terminal member as viewed in an axial direction (X-axis direction)

As shown in FIG. 5, the extension 73 is a plate parallel to the XY-plane. The extension 73 is disposed so that a plate surface 73a of the extension 73 does not oppose the outer circumferential surface of the choke coil 43. In other words, the extension 73 has an end surface 73b arranged to oppose the outer circumferential surface of the choke coil 43. More specifically, the end surface 73b of the extension 73 is configured to oppose in the Y-axis direction a central portion of the choke coil 43 with respect to the Z-axis direction.

With the electric component 40, power supplied from the external connecter, which is connected to the connector 33, sequentially flows to the terminal T, the thermistor 44, the second terminal member 42, the choke coil 43, the first terminal member 41, the pigtail 38a, and the brush 38. That is, the terminal T, the thermistor 44, the second terminal member 42, the choke coil 43, the first terminal member 41, and the pigtail 38a define a power feed circuit from the connector 33 to the brush 38.

The other electric component (electric component located toward side underneath plane of FIG. 2), which is not shown, includes the first terminal member 41, the second terminal member 42, and the choke coil 43 (without thermistor 44) in the same manner as the electric component 40 located toward upward from the plane of FIG. 2, and is configured so that the second connecting portion 72 of the second terminal member 42 is connected to a terminal that is embedded in the holder 31. That is, a power feed circuit from the connector 33 to the brush 38 of the electric component located at the rear side of the plane of the FIG. 2 has a structure in which the thermistor 44 is omitted from the electric component 40 located at the front side.

A method for manufacturing the brush device 30 (method for coupling the electric component 40 to the holder 31) and its operation will now be described.

First, as shown in FIG. 3, a connecting process is performed to connect the first and second terminal members 41 and 42, before separation from each other, to the choke coil 43, the thermistor 44, and the brush 38 (pigtail 38a). This assembles an assembly P (ASSY component) including the first and second terminal members 41 and 42, before separation from each other, the choke coil 43, the thermistor 44, and the brush 38 (pigtail 38a).

Next, a coupling process is performed to couple the assembly P, which is formed in the connecting process, to the holder main body 32 of the holder 31. In the coupling process, the first section 61 of the first terminal member 41 (or first section 71 of second terminal member 42) is held by a jig (not shown) such as a chuck. Then, the assembly P is coupled to the holder 31 from the first end surface 45a of the core 45 in the axial direction of the choke coil 43 (X-axis direction). The contact portion 67 of the first terminal member 41 is brought into contact with the second end surface 45b of the core 45. This allows a reaction force from the choke coil holding portion 51 to be received with the contact portion 67 of the first terminal member 41 when inserting the choke coil 43 between the guide surface 52 of the choke coil holding portion 51 and the holding piece 53. As a result, in the coupling process, stress is relieved from the connecting portion (coil-side connecting portion 64) of the winding 46 of the choke coil 43 and the first terminal member 41 thereby avoiding breakage or the like of the connecting portion. In the coupled state in which the choke coil 43 is inserted in the choke coil holding portion 51, the first end surface 45a of the core 45 may be in contact with the base 34 of the holder main body 32 in the X-axis direction or may be separated from the base 34 of the holder main body 32.

After the choke coil 43 in the assembly P is inserted in the choke coil holding portion 51, the brush 38 is accommodated in the brush accommodation portion 37. Further, the second terminal 44b of the thermistor 44 in the assembly P is connected to the terminal T, which extends from the holder 31.

Subsequently, the planned cutting portion Cx is cut to separate the first terminal member 41 and the second terminal member 42. In this manner, a circuit, in which the thermistor 44 and the choke coil 43 are connected in series, is formed from the terminal T to the brush 38.

The contact portion 67 of the first terminal member 41 remains in contact with the second end surface 45b of the core 45 after performing assembling as described above. This releases force such as vibration, which is applied to the first terminal member 41, from the contact portion 67 toward the choke coil 43 and relieves stress from the connecting portion (coil-side connecting portion 64) of the winding 46 of the choke coil 43 and the first terminal member 41.

Advantages of the present embodiment will now be described.

(1) The first terminal member 41 includes the contact portion 67 that is in contact with the second end surface 45b of the core 45 of the choke coil 43. This releases force such as vibration, which is applied to the first terminal member 41, from the contact portion 67 toward the choke coil 43 and relives stress from the connecting portion (coil-side connecting portion 64) of the winding 46 of the choke coil 43 and the first terminal member 41. As a result, breakage or the like of the connecting portion is avoided.

Further, the method for manufacturing the brush device 30 in the present embodiment includes the connecting process, which connects the winding 46 of the choke coil 43 to the first terminal member 41, and the coupling process, which couples the assembly P including the choke coil 43 and the first terminal member 41 to the holder 31 from the first end surface 45a of the core 45 in its axial direction (X-axis direction) subsequent to the connecting process. Then, in the coupling process, the contact portion 67 of the first terminal member 41 is brought into contact with the second end surface 45b of the core 45. With this configuration, a reaction force from the holder 31 (choke coil holding portion 51) toward the choke coil 43 is received by the contact portion 67 of the first terminal member 41, which is in contact with the core 45. This relieves stress from the connecting portion of the winding 46 of the choke coil 43 and the first terminal member 41. As a result, breakage or the like of the connecting portion is limited.

(2) The first terminal member 41 includes the first section 61, which is located at a side opposite to the base 34 with respect to the core 45 in the axial direction (X-axis direction), and the second section 62, which extends from the first section 61 toward the base 34 in the axial direction and has the contact portion 67. With this configuration, in the coupling process, when the first section 61 of the first terminal member 41 is held with a jig such as a chuck for coupling, the first section 61 is located at a side opposite to the base 34 with respect to the core 45. Thus, the jig can easily hold the first section 61 of the first terminal member 41.

(3) The first section 61 includes the opposing portion 65, which opposes the second end surface 45b of the core 45 in the axial direction (X-axis direction), and the second section 62 is extended from the opposing portion 65. With this configuration, when the first section 61 of the first terminal member 41 is held with a jig for coupling in the coupling process, the choke coil 43 receives a reaction force from the holder 31 with the contact portion 67 in a preferred manner. Therefore, breakage or the like is further avoided in the connecting portion of the winding 46 of the choke coil 43 and the first terminal member 41.

(4) The second section 62 includes the fastening portion 66 that is fitted and fixed to the holder 31. In this manner, the second section 62 includes the contact portion 67 and the fastening portion 66 that are integrated with each other. This allows the first terminal member 41 to be reduced in size.

(5) The power feed circuit extending from the connector 33 to the brush 38 includes the first terminal member 41, which is connected to the first terminal wire 46a of the choke coil 43 (winding 46), and the second terminal member 42, which is connected to the second terminal wire 46b at the opposite side. The first terminal member 41 includes the first connecting portion 63 connected to the pigtail 38a of the brush 38, and the second terminal member 42 includes the second connecting portion 72 connected to the thermistor 44. As viewed in the axial direction of the choke coil 43 (X-axis direction), the first connecting portion 63 and the second connecting portion 72 are locate at opposite sides of the choke coil 43.

With the above configuration, in the power feed circuit from the connector 33 to the brush 38, the part that is connected to the first terminal wire 46a of the choke coil 43 (portion from first terminal wire 46a to brush 38) and the part that is connected to the second terminal wire 46b in the power feed circuit (portion from second terminal wire 46b to end closer to connector 33 of terminal T) are spaced apart from each other. This limits parasitic capacitance generated between the two parts in the circuit. Therefore, the generation of bypassing noise flowing through the two parts is limited. As a result, noise that flows, for example, from the brush 38 to the connector 33 is limited. The electric component hidden in FIG. 2 (electric component without thermistor 44) has the same configuration as the electric component 40 except in that the second connecting portion 72 is connected to a terminal extending from the holder 31. Therefore, the electric component located toward the side underneath the plane of FIG. 2 also has the same advantages as the electric component 40 shown in FIG. 2.

Further, the first connecting portion 63 of the first terminal member 41 is connected to the pigtail 38a of the brush 38, and the second connecting portion 72 of second terminal member 42 is connected to the thermistor 44 (or terminal extending from holder 31). Thus, even when the part that is connected to the first terminal wire 46a of the choke coil 43 in the power feed circuit and the part that is connected to the second terminal wire 46b in the power feed circuit are spaced apart from each other, the power feed circuit from the connector 33 to the brush 38 is configured in a preferred manner.

(6) The second terminal member 42 includes the extension 73, which is plate-like and extends in the axial direction of the choke coil 43 (X-axis direction), and the extension 73 is disposed so that the plate surface 73a of the extension 73 does not oppose the choke coil 43. This configuration restricts the flow of bypassing noise between the extension 73 of the second terminal member 42 and the choke coil 43. Thus, noise that flows from the brush 38 to the connector 33 is further reduced. For example, as indicated by the double-dashed lines (extension 73x) in FIG. 5, when the plate surface of the extension 73x opposes the outer circumferential surface of the choke coil 43, bypassing noise easily flows between the extension 73 of the second terminal member 42 and the choke coil 43. This is not preferable.

(7) The first connecting portion 63 and the second connecting portion 72 are arranged on the same plane that is parallel to the axial direction (XY-plane). In this manner, the brush device 30 as well as the motor 10 can be reduced in size in a direction orthogonal to the axis.

The present embodiment may be modified as follows. The present embodiment and the following modifications can be combined as long as the combined modifications remain technically consistent with each other.

In the first terminal member 41 of the above embodiment, the fastening portion 66 and the contact portion 67 are integrated with each other and included in the second section 62. However, the configuration is not particularly limited in such a manner.

For example, the first terminal member 41 shown in FIGS. 6A, 6B, and 6C includes a third section 81 and a fastening portion 82. The third section 81 extends downward from the first section 61 (extends toward base 34 in the axial direction) and is separate from the second section 62, which includes the contact portion 67. The third section 81 has the fastening portion 82 to be fastened to the holder 31. In the same manner as the above embodiment, the fastening portion 82 is press-fitted and fixed in the X-axis direction to a fitting portion (not shown) arranged in the holder main body 32. Further, the positioning portion 69 is formed at the upper part of the fastening portion 82 in the same manner as the above embodiment. Also, with the above-described configuration, force such as vibration, which is applied to the first terminal member 41, is released from the contact portion 67 toward the choke coil 43. This relieves stress from the connecting portion (coil-side connecting portion 64) of the winding 46 of the choke coil 43 and the first terminal member 41. As a result, breakage and the like of the connecting portion is limited.

The second terminal member 42 may include a contact portion that is in contact with the second end surface 45b of the core 45.

In the above embodiment, the end surface 73b of the extension 73 of the second terminal member 42 is configured to oppose the central portion of the choke coil 43 with respect to the Z-axis direction in the Y-axis direction. Instead, as indicated by the double-dashed lines (extension 73y) in FIG. 5, one end of the extension 73y may be configured to oppose an end of the choke coil 43 with respect to the Z-axis direction in the Y-axis direction. The plane surface of the extension 73y does not oppose the choke coil 43 because of the position of the extension 73y. This restricts the flow of bypassing noise between the extension 73y and the choke coil 43.

In the above embodiment, in the power feed circuit from the connector 33 (upstream side) to the brush 38 (downstream side), the choke coil 43 is located at a downstream side of the thermistor 44 (between thermistor 44 and brush 38). Instead, the choke coil 43 may be located at an upstream side of the thermistor 44 (between connector 33 and thermistor 44). In this case, for example, the second connecting portion 72 of the second terminal member 42, which is connected to the second terminal wire 46b of the choke coil 43, is connected to the terminal T, and the first connecting portion 63 of the first terminal member 41, which is connected to the first terminal wire 46a of the choke coil 43, is connected to the second terminal 44b of the thermistor 44. Then, the first terminal 44a of the thermistor 44 is connected to the pigtail 38a, for example, via a terminal member. Also in such a configuration, when the first connecting portion 63 of the first terminal member 41 and the second connecting portion 72 of the second terminal member 42 are located at opposite sides of the choke coil 43 as viewed in the axial direction (X-axis direction), in the same manner as the above embodiment, the part that is connected to the first terminal wire 46a of the choke coil 43 in the power feed circuit is spaced apart from the part that is connected to the second terminal wire 46b in the power feed circuit. This restricts the flow of bypassing noise between the two parts in the circuit.

In the power feed circuit from the connector 33 to the brush 38, the thermistor 44 may be omitted, and the second connecting portion 72 of second terminal member 42 may be connected to the terminal T serving as the second circuit component. Further, instead of the thermistor 44, a dummy member (having same shape as thermistor 44) may be arranged to simply connect the second terminal member 42 and the terminal T.

The second terminal member 42 in the above embodiment is cut and separated from the first terminal member 41 after being coupled to the holder 31. Instead, the second terminal member 42 may be separated from the first terminal member 41 before being coupled to the holder 31.

In the above embodiment, the choke coil 43 includes the core 45 and the winding 46. Instead, the choke coil 43 may have a hollow structure that does not include the core 45.

The number of the brushes 38 of the motor 10 is not limited to two like in the above embodiment, and may be three or more. Apparently, the number of the choke coils 43 and the number of the terminal members may be changed in accordance with the number of the brushes 38.

In the above embodiment, the motor 10 includes the reduction gear 12. Instead, the motor 10 may include only the motor main body 11, and the reduction gear 12 may be omitted.

In the above embodiment, the motor 10 is used as a drive source for an electric seat device of a vehicle. Instead, the motor 10 may be used as a drive source for other devices installed in a vehicle (power window device, wiper device, sliding roof device, sliding door device, door closer device, and the like). Further, the motor 10 may be applied to a motor that is not for use with a vehicle.

The invention claimed is:

1. A brush device, comprising:
a holder including a base, the base extending in a direction orthogonal to an axial direction of an armature;
a brush coupled to the holder and configured to feed power to a commutator of the armature;
a choke coil including a core, which is arranged on the holder, and a winding, which is wound around an outer circumference of the core and electrically connected to the brush, the core extending in the axial direction of the armature and including
(i) a first end surface in a longitudinal direction faced toward the base of the holder and
(ii) a second end surface in the longitudinal direction located at a side opposite to the first end surface; and
a terminal member coupled to the holder and connected to the winding, wherein
the terminal member includes a first section, which is located at a side opposite to the base with respect to the core in the axial direction of the armature, and a second section, which extends from the first section toward the base in the axial direction, and
the second section includes (i) a fastening portion, which is located at a distal end of the second section toward the base, and (ii) a contact portion that is located at a portion of the second section toward the first section with respect to the fastening portion, the fastening portion being fitted and fixed to the holder, and the contact portion being in contact with the second end surface of the core.

2. The brush device according to claim 1, wherein
the first section includes an opposing portion that opposes the second end surface of the core in the axial direction, and
the second section extends from the opposing portion.

3. A motor, comprising:
an armature;
a field magnet opposing the armature; and
the brush device according to claim 1.

4. A method for manufacturing a brush device, wherein the brush device includes:
a holder including a base, the base extending in a direction orthogonal to an axial direction of an armature;
a brush coupled to the holder and configured to feed power to a commutator of the armature;
a choke coil including a core, which is arranged on the holder, and a winding, which is wound around an outer circumference of the core and electrically connected to the brush, the core extending in the axial direction of the armature and including
(i) a first end surface in a longitudinal direction faced toward the base of the holder and
(ii) a second end surface located at a side opposite to the first end surface; and
a terminal member coupled to the holder and connected to the winding, wherein
the terminal member includes a first section, which is located at a side opposite to the base with respect to the core in the axial direction, and a second section, which extends from the first section toward the base in the axial direction, and
the second section includes (i) a fastening portion, which is located at a distal end of the second section toward the base, and (ii) a contact portion that is located at a portion of the second section toward the first section with respect to the fastening portion, the fastening portion being fitted and fixed to the holder, and the contact portion being in contact with the second end surface of the core,
the method comprising:
connecting the winding of the choke coil to the terminal member; and
subsequent to the connecting, coupling an assembly including the choke coil and the terminal member to the holder from the first end surface of the core in its axial direction,
wherein the coupling includes bringing the contact portion of the terminal member in contact with the second end surface of the core.

* * * * *